(12) United States Patent
Suthar

(10) Patent No.: US 10,354,179 B2
(45) Date of Patent: *Jul. 16, 2019

(54) WOOD INLAY CARD AND METHOD FOR MAKING THE SAME

(71) Applicant: Capital One Services, LLC, McLean, VA (US)

(72) Inventor: Om J. Suthar, Brambleton, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/190,759

(22) Filed: Nov. 14, 2018

(65) Prior Publication Data

US 2019/0080216 A1 Mar. 14, 2019

Related U.S. Application Data

(63) Continuation of application No. 15/825,077, filed on Nov. 28, 2017, now Pat. No. 10,152,670, which is a continuation of application No. 15/823,507, filed on Nov. 27, 2017, now Pat. No. 10,163,050.

(60) Provisional application No. 62/427,634, filed on Nov. 29, 2016.

(51) Int. Cl.

| G06K 5/00 | (2006.01) |
|---|---|
| G06K 19/02 | (2006.01) |
| G06K 19/077 | (2006.01) |
| G06K 19/00 | (2006.01) |
| B32B 21/04 | (2006.01) |

(52) U.S. Cl.
CPC ...... *G06K 19/07722* (2013.01); *B32B 21/042* (2013.01); *G06K 19/00* (2013.01); *G06K 19/02* (2013.01); *G06K 19/07728* (2013.01); *B32B 2425/00* (2013.01)

(58) Field of Classification Search
USPC ............................ 235/380, 451, 488, 492
See application file for complete search history.

(56) References Cited

U.S. PATENT DOCUMENTS

| 5,852,289 | A | 12/1998 | Masahiko |
| 6,644,552 | B1 | 11/2003 | Herslow |
| D632,735 | S | 2/2011 | McGrane |
| D687,886 | S | 8/2013 | Ahrabian |
| 2004/0026518 | A1 | 2/2004 | Kudo |
| 2004/0130771 | A1 | 7/2004 | Carlson |
| 2007/0097510 | A1 | 5/2007 | Carlson |
| 2009/0039154 | A1 | 2/2009 | Williams |
| 2009/0266486 | A1 | 10/2009 | Ihara |
| 2011/0023289 | A1 | 2/2011 | Finn |
| 2011/0031319 | A1 | 2/2011 | Kiekhaefer |
| 2012/0328865 | A1 | 12/2012 | Riedl |
| 2014/0074696 | A1* | 3/2014 | Glaser .................. G06Q 20/341 705/39 |

(Continued)

*Primary Examiner* — Tuyen K Vo
(74) *Attorney, Agent, or Firm* — Finnegan, Henderson, Farabow, Garrett & Dunner LLP

(57) ABSTRACT

A transaction card construction and a method for making a transaction card are provided for improving card performance. The transaction card construction comprises an inlay component comprising wood and a housing component. The inlay may comprise a wood or wood-containing layer and a backer layer. The backer layer may comprise the same or a different wood or wood-containing layer, or a non-woven fiber material.

20 Claims, 9 Drawing Sheets

(56) References Cited

U.S. PATENT DOCUMENTS

2015/0298429 A1    10/2015  Ricketts
2017/0017871 A1*  1/2017  Finn ................. G06K 19/07722
2018/0339503 A1*  11/2018  Finn ..................... B32B 37/142

* cited by examiner

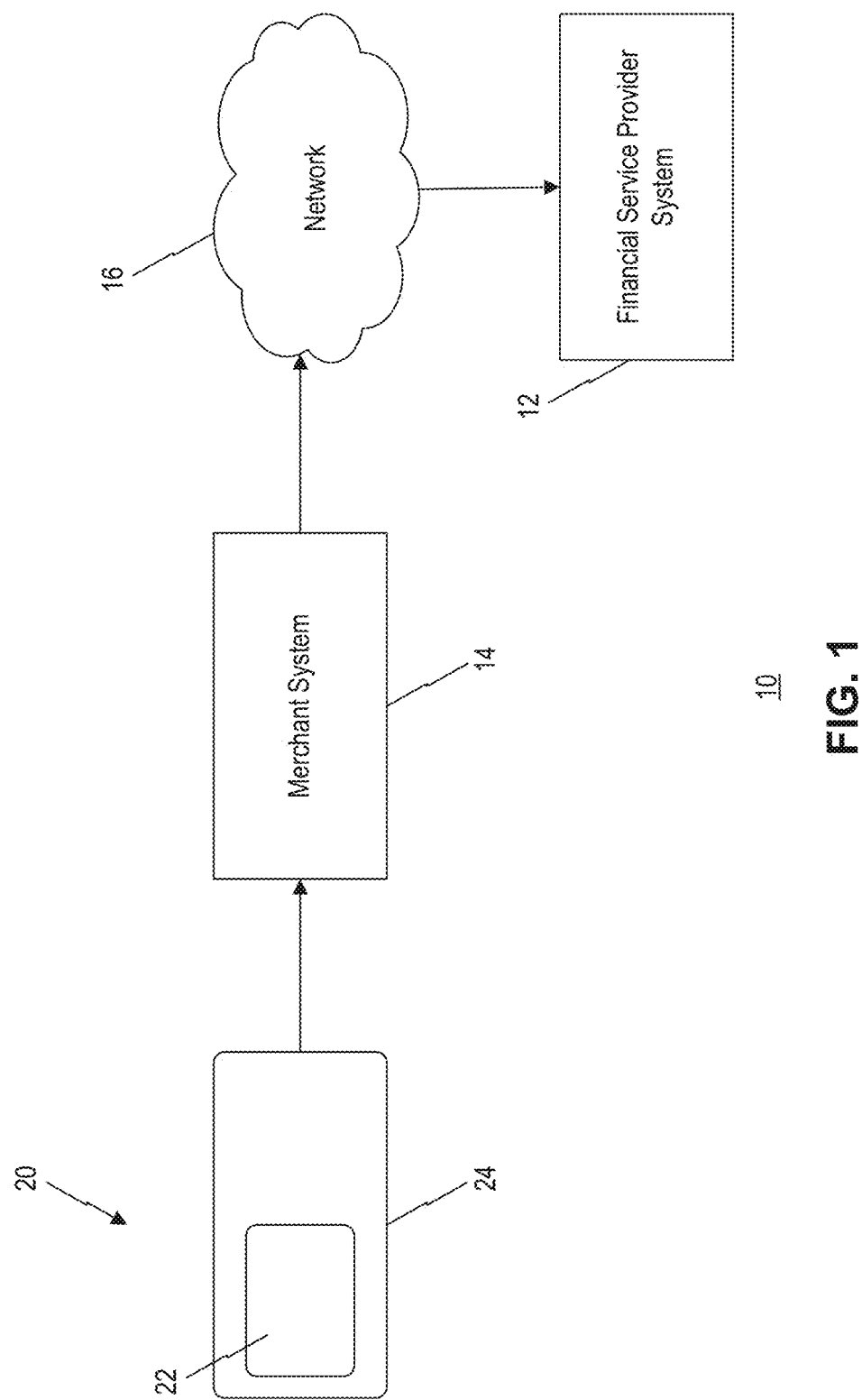

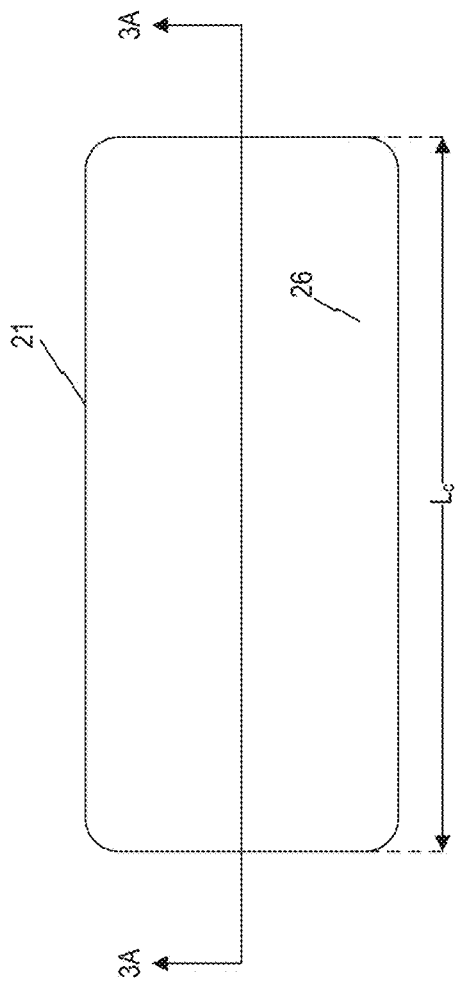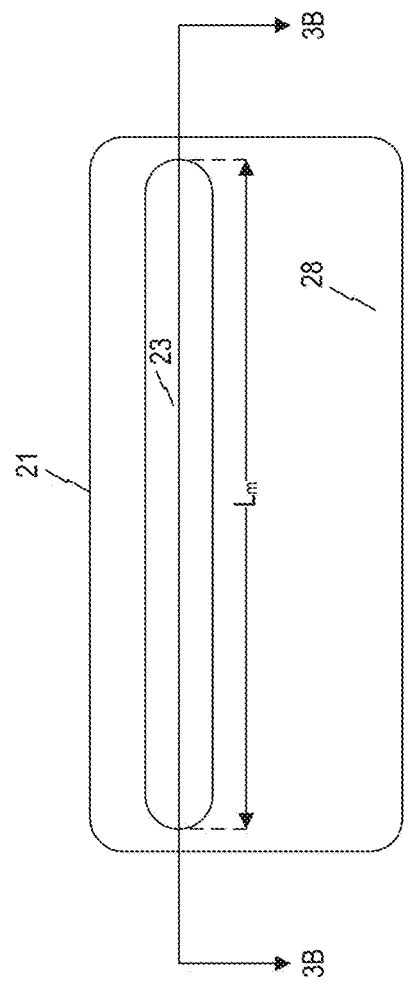
FIG. 2A
FIG. 2B

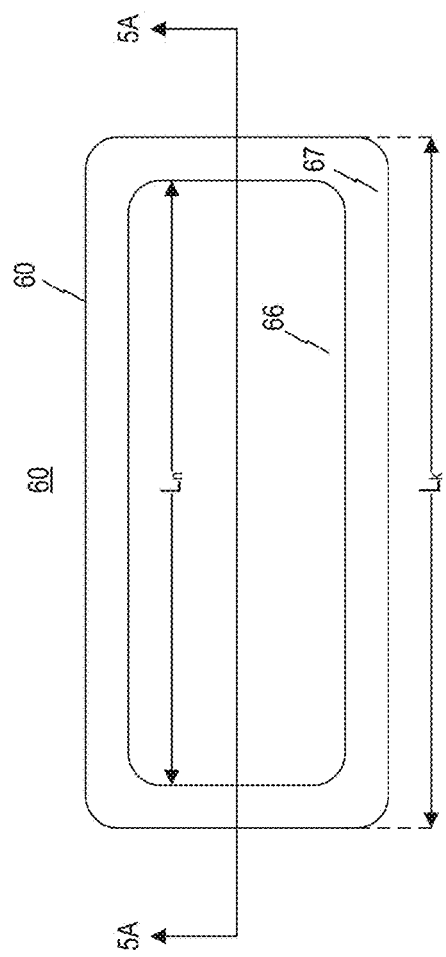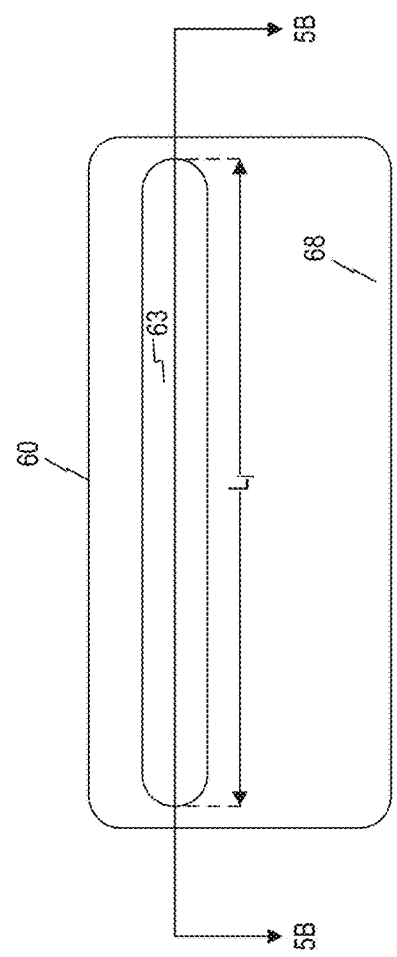
FIG. 4A
FIG. 4B

WOOD INLAY CARD AND METHOD FOR MAKING THE SAME

CROSS-REFERENCE TO RELATED APPLICATION

The present application is a continuation of U.S. patent application Ser. No. 15/825,077, filed Nov. 28, 2017, which is a continuation of U.S. application Ser. No. 15/823,507, filed Nov. 27, 2017, which and claims priority under 35 U.S.C. § 119 to U.S. Provisional Patent Application No. 62/427,634, filed on Nov. 29, 2016, the disclosures of which are incorporated herein by reference in their entireties.

TECHNICAL FIELD

The disclosed embodiments generally relate to transaction cards, and more particularly, to inlay cards for improving card user satisfaction and card performance.

BACKGROUND

Transaction cards, such as credit and debit cards, have increasingly become a primary means for customers to complete financial transactions. Currently transaction cards are typically constructed in a sheeted laminate press. The shape of the card is die cut and then the card is personalized. Typically, transaction cards are cut from laminated sheets of polyvinyl chloride (PVC) or polycarbonate (PC), or other similar materials. After the overall shape of the card is formed, the card may be modified to add functional and/or visual features. For example, a magnetic strip and/or microchip may be affixed to one side, the card may be stamped with the card number and customer name, and color or a design may be added for appearance.

In addition, as transaction cards increase in prevalence, expectations for transaction card quality have increased. Transaction cards have increasingly been made to meet higher standards regarding materials, durability, and security. Further, traditional card manufacturing methods, which have employed limited card construction techniques and materials, such as PVC, PC, and other similar materials, continue to utilize laminate-based techniques for card construction, thus failing to address limitations inherent in such constructions.

The present disclosure is directed to overcoming one or more of the problems set forth above and/or other problems associated with conventional/traditional transaction cards.

SUMMARY

The disclosed embodiments relate to a transaction card and a process/method for constructing the transaction card, wherein the transaction card includes an inlay comprising a wood material that is secured into a card housing.

Consistent with a disclosed embodiment, a transaction card may include: a housing component having a first housing surface, and a second housing surface opposite the first housing surface; an inlay component having a first inlay surface, and a second inlay surface opposite the first inlay surface, the first inlay surface comprising a wood material; and the inlay and the housing are joined via the second inlay surface and the first housing surface.

Consistent with a disclosed embodiment, a transaction card may include: a housing component having a first housing surface, and a second housing surface opposite the first housing surface; a wood inlay component having a first inlay surface, and a second inlay surface opposite the first inlay surface; and the wood inlay component and the housing component are joined via the second inlay surface and the first housing surface.

Consistent with another disclosed embodiment, a method of manufacturing a transaction card may include: forming a housing component having a first housing surface and a second housing surface opposite the first housing surface; forming an inlay component having a first inlay surface and a second inlay surface opposite the first inlay surface, the first inlay surface having a wood material; and joining the inlay component and the housing component via the second inlay surface and the first housing surface.

Consistent with another disclosed embodiment, a method of manufacturing a transaction card may include: forming a housing component having a first housing surface and a second housing surface opposite the first housing surface; forming a wood inlay component having a first inlay surface and a second inlay surface opposite the first inlay surface; and joining the wood inlay component and the housing component via the second inlay surface and the first housing surface.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIG. 1 is a block diagram of an exemplary transaction system, consistent with disclosed embodiments;

FIG. 2A is a front view of a first exemplary transaction card, consistent with disclosed embodiments;

FIG. 2B is a back view of the first exemplary transaction card, consistent with disclosed embodiments;

FIG. 4A is a front view of a second exemplary transaction card, consistent with disclosed embodiments;

FIG. 4B is a back view of the second exemplary transaction card, consistent with disclosed embodiments;

DETAILED DESCRIPTION

Figure 3A:
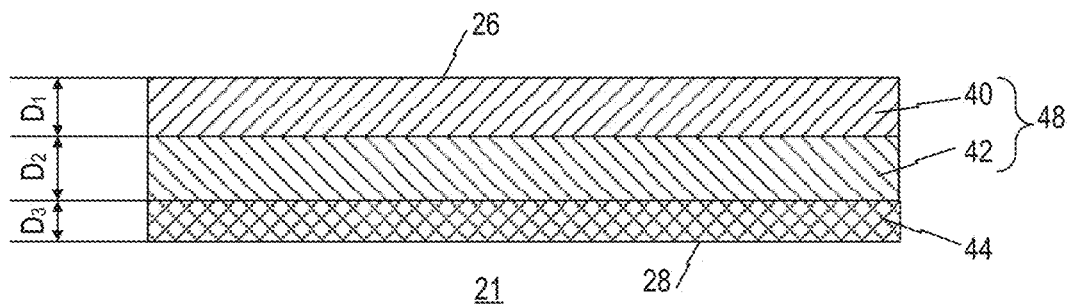
FIG. 3A is a cross-sectional view of the first exemplary transaction card in FIG. 2A taken along line 3A-3A, consistent with disclosed embodiments.

Reference will now be made in detail to the disclosed embodiments, examples of which are illustrated in the accompanying drawings. Wherever convenient, the same reference numbers will be used throughout the drawings to refer to the same or like parts.

The term "transaction card," as used herein may refer to a physical product that is configured to provide information, such as financial information (e.g., card numbers, account numbers, etc.), quasi-financial information (e.g., rewards balance, discount information, etc.) and/or individual-identifying information (e.g., name, address, etc.), when the card is read by a card reader. Examples of transaction cards include credit cards, debit cards, gift cards, rewards cards, frequent flyer cards, merchant-specific cards, discount cards, identification cards, membership cards, and driver's licenses, but are not limited thereto. The physical properties of the transaction card (e.g., size, flexibility, location of various components included in the card) may meet the various international standards, including, e.g., ISO/IEC 7810, ISO/IEC 7811, ISO/IEC 7812, ISO/IEC 7813, ISO/IEC 7816, ISO 8583, ISO/IEC 4909, and ISO/IEC 14443. For example, a transaction card may have a dimension of 85.60 mm (width) by 53.98 mm (height) by 0.76 mm (thickness), as specified in ISO/IEC 7810.

Disclosed embodiments include transaction cards and methods for manufacturing a transaction card. For example, disclosed embodiments include transaction card comprising a housing component having a first housing surface, and a second housing surface opposite the first housing surface. The card may further include an inlay component having a first inlay surface, and a second inlay surface opposite the first inlay surface, the first inlay surface comprising wood. The inlay component and the housing component may be joined via the second inlay surface and the first housing surface.

As used herein, the term "wood" may refer to natural wood (i.e., hard fibrous substance forming the bulk of trees, shrubs, and the like beneath the bark) and materials containing natural wood (i.e., materials of which natural wood is an ingredient, constituent, or component). Examples of wood include, but are not limited to, pine wood, walnut wood, cherry wood, mahogany wood, bamboo wood, oak wood, and composite materials, such as fiberboard (e.g., medium-density fiberboard (MDF)), plywood, and particle board, etc. Different types of wood materials, when used to construct a transaction card, may cause the transaction card to exhibit different mechanical properties (e.g., flexibility, elasticity, strength, etc.). These differences may be leveraged to allow the transaction card to meet specifications required for credit card applications according to the various international standards mentioned above, and to achieve a desired wood-like feel or appearance. In some embodiments, a wood surface may be etched or engraved to form various markings thereon, such as, for example, a card holder's name, a card number, and/or other personal or transactional information. In some embodiments, the wood surface may be coated with protective layer, for example, a stain, or a clear or translucent layer, such as, a lacquer, shellac, polyurethane, acrylic, or other type of non-opaque coating.

In some embodiments, the inlay component may include a first inlay layer comprising wood and a second inlay layer comprising a backer material. For example, in some embodiments, the first inlay layer may comprise a first wood material, and the backer material may comprise a second wood material. To enhance the mechanical performance of the card (e.g., rigidity, strength, etc.), the first inlay layer may be rotated with respect to the second inlay layer such that a wood grain direction of the first inlay layer is not parallel with a wood grain direction of the second inlay layer. In other embodiments, the backer material comprises a non-woven fiber material. For example, the backer material comprises poly-paraphenylene terephthalamide.

In some embodiments, the inlay component comprises medium-density fiberboard.

In some embodiments, a wood grain pattern may be formed on the first inlay surface.

The transaction card may further comprise a data storage component joined to the housing. For example, the transaction card may comprise a data storage component disposed between the inlay component and the housing component.

In addition, disclosed embodiments may include a method of manufacturing a transaction card including the steps of forming a housing component having a first housing surface and a second housing surface opposite the first housing surface; forming an inlay component having a first inlay surface and a second inlay surface opposite the first inlay surface, the first inlay surface comprising wood; and joining the inlay component and the housing component via the second inlay surface and the first housing surface.

In some embodiments, forming the inlay component may include forming a first inlay layer comprising wood; forming a second inlay layer comprising a backer material; and joining the first and second inlay layers. In some embodiments, the first inlay layer may comprise a first wood material, and the second backer material comprises a second wood material. The method may further include rotating the first inlay layer with respect to the second inlay layer such that a wood grain direction of the first inlay layer is not parallel with a wood grain direction of the second inlay layer. In other embodiments, the backer material may comprise a non-woven fiber material. For example, the backer material may comprise poly-paraphenylene terephthalamide.

In some embodiments, the method may include softening the wood of the inlay component. Softening the wood of the inlay component may prevent or reduce the likelihood of damage caused by flexure of the transaction card.

In some embodiments, the method may include forming a wood grain pattern on the first inlay surface.

In some embodiments, the method may include disposing a data storage component on the second housing surface. For example, the method may further include disposing a data storage component between the inlay and the housing.

FIG. 1 illustrates an exemplary transaction system 10. Transaction system 10 may be configured to receive and send information between components of transaction system 10 and components outside of transaction system 10. Transaction system 10 may include a financial service provider system 12 and a merchant system 14 in communication with each other through a network 16. Transaction system 10 may include additional and/or alternative components.

Financial service provider system 12 may include one or more computer systems associated with an entity that provides financial services. For example, the entity may be a bank, credit union, credit card issuer, or other type of financial service entity that generates, provides, manages, and/or maintains financial service accounts for one or more customers. Financial service accounts may include, for example, credit card accounts, checking accounts, savings accounts, loan accounts, reward accounts, and any other types of financial service accounts. Financial service accounts may be associated with physical financial service transaction cards, such as credit or debit cards that customers use to perform financial service transactions, such as purchasing goods and/or services online or at a point of sale (POS) terminal. Financial service accounts may also be associated with electronic financial products and services, such as a digital wallet or similar account that may be used to perform electronic transactions, such as purchasing goods and/or services online.

Merchant system 14 may include one or more computer systems associated with a merchant. For example, merchant system 14 may be associated with an entity that provides goods and/or services (e.g., a retail store). The merchant may include brick-and-mortar location(s) that a customer may physically visit to purchase goods and services using the transaction cards. Such physical locations may include computing devices (e.g., merchant system 14) that perform financial service transactions with customers (e.g., POS terminal(s), kiosks, etc.). Additionally or alternatively, merchant system 14 may be associated with a merchant who provides an electronic shopping environment, such as a website or other online platform that consumers may access using a computer through a browser, a mobile application, or similar software. Merchant system 14 may include a client device, such as a laptop computer, desktop computer, smart phone, or tablet, which a customer may operate to access the electronic shopping mechanism.

Network 16 may include any type of network configured to facilitate communications and data exchange between components of transaction system 10, such as, for example, financial service provider system 12 and merchant system 14. Network 16 may include a Local Area Network (LAN), a Wide Area Network (WAN), such as the Internet. Network 16 may be a single network or a combination of networks. Network 16 is not limited to the above examples and transaction system 10 may implement any type of network that allows entities (shown and not shown) of transaction system 10 to exchange data and information.

Transaction system 10 may be configured to conduct a transaction using a transaction card 20. In some embodiments, financial service provider system 12 may provide transaction card 20 to a customer for use in conducting transactions associated with a financial service account held by the customer. For example, the customer may use transaction card 20 at a merchant location to make a purchase. During the course of the purchase, information may be transferred from transaction card 20 to merchant system 14 (e.g., a point of sale device). Merchant system 14 may communicate with financial service provider system 12 via network 16 to verify the information and to complete or deny the transaction. For example, merchant system 14 may receive account information from transaction card 20. Merchant system 14 may transmit the account information and a purchase amount, among other transaction information, to financial service provider system 12. Financial service provider system 12 may settle the transaction by transferring funds from the customer's financial service account to a financial service account associated with the merchant.

While transaction system 10 and transaction card 20 are depicted and described in relation to transactions that involve customers, merchants, and financial service providers, it should be understood that these entities are used only as an example to illustrate one environment in which transaction card 20 may be used. Transaction card 20 is not limited to financial products and may be any physical card product that is configured to provide information to another device when read by a card reader. For example, transaction card 20 may be an identification card configured to provide information to a device in order to identify the holder of the card (e.g., driver's license).

In some embodiments, transaction card 20 may include a data storage component 24 disposed in a card frame 22. As used herein, a "data storage component" may be or include one or more devices configured to receive, store, process, provide, transfer, send, delete, and/or generate data or other information. For example, data storage component 24 may include a microchip (e.g., EMV chip), a communication device (e.g., Near Field Communication (NFC) antenna, radiofrequency identification (RFID) device, Bluetooth® device, WiFi device), a magnetic strip, a barcode, a Quick Response (QR) code, and/or other devices. Data storage device 24 may be configured to store information in a computer-readable format. For example, data storage device may be configured to store information in a format that can be read by merchant system 14, transmitted over network 16, and read or processed by financial service provider system 12 (referring to FIG. 1).

FIGS. 2A and 2B are front and rear views, respectively, of a first exemplary transaction card 21. FIG. 2A shows a front surface 26 of card 21 with a length defined as $L_c$, and FIG. 2B shows a rear surface 28 of card 21, with a surface 23 of a data storage component exposed (i.e., a magnetic strip in this exemplary embodiment). The magnetic strip may have a length $L_m$ which may be less than the card length $L_c$, and surface 23 may be flush with rear side surface 28.

In some embodiments, front surface 26 may include or be provided with visual details such as a customer name, an account number, date information, a signature associated with the customer (not shown), and/or other information. Such visual details may be generated during a process of forming the card (e.g., pressing, laminating, injection molding, etc.) or during a process subsequent to card formation (e.g., milling, laser cutting/etching, stamping, printing, etc.). For example, the signature may be etched into front surface 26 by a fiber laser. In some embodiments, such visual details may be included on another surface (e.g., rear surface 28) of transaction card 21.

FIG. 3A illustrates a cross-sectional view of an exemplary embodiment of card 21 shown in FIG. 2A taken along line 3A-3A. FIG. 3A is a magnified view (not to scale) of the card which illustrates surfaces 26 and 28. As shown, card 21 may include an inlay component 48 having a first (e.g., a top) inlay layer 40 and a second (e.g., a bottom) inlay layer 42 (serving as a backer). Card 21 may also include a card housing component 44 configured to receive inlay component 48. First inlay layer 40, second inlay layer 42, and housing component 44 may have a thickness of $D_1$, $D_2$, and $D_3$, respectively. As noted above, the thicknesses of $D_1$, $D_2$, and $D_3$ are magnified for illustrative purpose only and are not necessarily to scale (nor are the apparent relative sizes of $D_1$, $D_2$, and $D_3$ with respect to each other necessarily to scale). It is noted that the values of thicknesses $D_1$, $D_2$, and $D_3$ may vary based on the overall dimensions of card 21, the types of materials employed for making components of card 21, and/or the processes utilized for manufacturing components of card 21.

First inlay layer 40 and second inlay layer 42 may be formed separately and joined to form inlay component 48. First inlay layer 40 may comprise wood. That is, first inlay layer 40 may include a wood material. For example, first inlay layer 40 may be formed of a sheet of natural wood. Alternatively, first inlay layer 40 may be formed of a composite material that includes or contains wood, such medium-density fibreboard (MDF) or another wood-containing material.

In some embodiments, second inlay layer 42 may also comprise wood. That is, second inlay layer 42 may include a wood material. For example, second inlay layer 42 may be formed of a sheet of natural wood. Alternatively, second inlay layer 42 may be formed of a composite material that includes or contains a wood material, such as MDF or another type of wood-containing material.

Second inlay layer 42 may be configured to support first inlay layer 40, for example, to prevent warping, curling, cracking, or other deformation of first inlay layer 40. As mentioned above, different types of wood and wood-containing materials exhibit different mechanical properties that can affect how card 21 performs mechanically. When made thin enough to be used as a component of card 21, wood materials can become flexible, brittle, and prone to warping, curling or breaking. To mitigate these effects, second inlay layer 42 may be formed of a wood or non-wood material having mechanical properties configured to compliment the mechanical properties of first inlay layer 40. That is, second inlay layer 42 may be formed of a wood or non-wood material that, when paired with the material of first inlay layer 40, causes card 21 to achieve desired overall mechanical properties (i.e., flexibility, strength, etc.). In this way, a desired type of wood material may be selected from a broad range of wood types to form first inlay layer 40 (e.g., to achieve desired visual and/or tactile card properties), and the material of second inlay layer 42 may be selected and dimensioned to support first inlay layer 42 and ensure that the overall mechanical properties of card 21 are sufficient to resist damage and satisfy applicable standards. Such permissible variation in the use of materials may broaden the range of material types that can be used to form card 21, since not all wood materials (by themselves or in their natural form) may be able to satisfy the mechanical requirements necessary for use as an inlay layer. That is, instead of forgoing the use of certain types of wood materials in first inlay layer 40 due to inadequate mechanical properties, such wood types may be used in combination with other materials of second inlay layer 42 to reduce the likelihood of failure such materials, thereby enabling the use of wood materials that may not have otherwise been suitable.

In some embodiments, desired visual and/or tactile properties of first inlay layer 40 may be achieved by using a wood material that can be modified at a surface portion to be imparted with certain wood-like characteristics. For example, certain wood materials having desirable visual and/or tactile properties but are too costly or prone to failure may be less desirable for use as first inlay layer 40. To achieve similar visual and/or tactile properties of such wood materials, a different material, such as a composite material (e.g., MDF) may be modified to exhibit the same or similar characteristics.

For example, MDF (or another type of wood or wood material) may be modified at its surface to resemble a different type of wood. In some embodiments, the wood grain pattern of a desired type of wood may be pressed, etched, carved, or otherwise imparted onto the surface of MDF (or other wood or wood material). The MDF surface having been imparted with the wood grain design may then be stained or otherwise colored to match the natural or stained finish of the desired wood material. In this way, the MDF (or other wood or wood material) may be configured to look like the desired wood material.

At the same time, the MDF (or other wood material) may exhibit tactile qualities similar to the desire type of wood. For example, an MDF (or other wood or wood material) may be chosen that has similar tactile properties as the desired wood. Post processing techniques, such as sanding, sand blasting, etching, chemical treating, or other techniques, may be used to cause the MDF (or other wood or wood material) to more closely resemble the tactile properties of the desired wood. In this way, the range of surface finishes that can be produced on card 21 that resemble types of natural or modified wood can broadened to include materials whose natural mechanical properties may be insufficient to meet the mechanical or standardized requirements of a transaction card.

First and second inlay layers 40 and 42 may be manufactured, for example, by forming (e.g., die-cutting) a layer of wood or wood-containing material from a piece of material stock. Inlay layers 40, 42 may have a thickness ranging from, for example, about ¹⁄₂₄ inch to about ¹⁄₁₆ inch. In this exemplary thickness range, wood and wood-containing materials may exhibit a tendency to curl, ripple, or crack. To avoid these tendencies during the formation of inlay layers 40, 42, the wood or wood-containing material from which first and second inlay layers 40 and 42 are formed may be softened prior to being processed. For example, a veneer softener that temporarily plasticizes wood particles may be applied prior to processing.

First and second inlay layers 40, 42 may be thinned during subsequent manufacturing processes to achieve a desired thickness. For example, inlay layers 40, 42 may be sanded, shaved, or otherwise thinned during formation of inlay component 48. In some embodiments, inlay layers 40, 42 may be thinned to achieve a thickness ranging from, for example, about 10 mil to about 30 mil (depending on card performance criteria). It is noted that other thickness ranges may be used depending on, for example, standardization constraints (e.g., ISO standards), functional limitations, or other considerations. The desired thickness range of inlay layers 40, 42 may also be selected based on the type of wood or wood-containing materials used. That is, different types wood may exhibit different mechanical properties at varying thicknesses. For example, some wood generally considered to be hard may become brittle or warp when thinned. Other types of wood generally considered to be soft may exhibit greater durability when thinned.

In some embodiments, inlay layers 40, 42 may be formed of a single type of wood material. For example, each inlay layer 40, 42 may comprise one type of wood, such as pine, walnut, bamboo, cherry, or other another type of wood or wood-containing material. In other embodiments, inlay layers 40 and 42 may each comprise a combination of woods and/or wood-containing materials. Combinations of different types of woods and/or wood-containing materials may be selected to achieve a desired net mechanical effect of the different materials. For example, stiffer or brittle materials may be combined with softer or stronger materials to improve the overall durability of the combination. For example, combinations of wood types exhibiting different mechanical properties may enhance the ability of the card to resist cracking, warping, permanent deformation, etc., during single- or multi-axis bending.

In some embodiments, inlay layers 40, 42 may be formed of the same material. For example, inlay layers 40, 42 may be formed of the same type of wood or wood-containing material. In other embodiments, inlay layers 40, 42 may be formed of different materials. That is, inlay layers 40, 42 may be formed of respectively different types of wood or wood-containing material. For instance, one layer formed of, for example, pine wood and the other formed of, for example, cherry wood. It is noted that other combinations including other or different types of wood and/or wood-containing materials may be used.

In some embodiments, a grain direction and/or pattern of first inlay layer 40 may be oriented differently with respect to a grain direction and/or pattern of second inlay layer 42. This may be known as "grain-crossing." For example, the grain direction and/or pattern of first inlay layer 40 may be rotated with respect to the grain direction and/or pattern of second inlay layer 42. In some embodiments, the grain direction/pattern of first inlay layer 40 may be rotated (or otherwise positioned or offset) at an angle of 0-360 degrees with respect to the grain direction/pattern of second inlay layer 42. For example, the grain directions and/or patterns of first and second inlay layers 40, 42 may be offset by 0-360°, 0-270°, 0-180°, 0-90°, 0-45°, 0-15°, etc. Such grain-crossing may provide the wood inlay and/or the card as a whole with greater rigidity, strength, and overall improved mechanical properties along multiple bending axes.

In some embodiments, to prevent the grain-crossing of first and second inlay layers 40, 42 from being visible, a visual blacker layer may be disposed between first and second inlay layers 40, 42. That is, inlay layers 40, 42 may be so thin that the grain pattern of one layer (e.g., a lower layer) may be visible through the other layer (i.e., a top layer), which may not present a natural-looking wood material. In such scenarios, a blocker layer, such as a translucent or opaque material (e.g., a thin film, an adhesive layer, a thin plastic sheet, etc.) or a similar material with its color matched to the outermost wood veneer color may be disposed between inlay layers 40, 42.

In some embodiments, the wood or wood material of inlay component 48 may comprise a layer formed of a medium-density fiberboard (MDF). For example, first inlay layer 40 may comprise or be formed of MDF. In other embodiments, inlay component 48 may comprise only a single inlay layer comprising MDF (as MDF is a relatively stiff and supportive material). In some embodiments, as mentioned above, a wood grain pattern appearance may be formed onto the layer of MDF (as normal MDF does not have a grain). For example, a wood grain pattern appearance may be die cast, stamped, etched, printed, laser cut, milled, etc., onto the layer of MDF to give the layer a wood grain appearance or finish. In some embodiments, the formed wood grain may be stained or otherwise treated to accentuate or enhance the wood grain appearance or finish. In other embodiments, other or different wood-containing materials may be used instead of or in addition to MDF.

Inlay layers 40, 42 may be joined to form inlay component 48 using any suitable method for joining thin layers of material. For example, inlay layers 40, 42 may be joined by laminating and pressing. In other embodiments, inlay layers 40, 42 may also or alternatively be joined using a thin layer (e.g., one micron thick) of adhesive. That is, an adhesive layer may be used to facilitate laminating and pressing during the process of forming wood inlay 48.

In some embodiments, the outer surface of first inlay layer 40 may be coated with protective layer. For example, first inlay layer 40 may be coated with a stain, which may also provide enhanced visual or tactile properties. A clear or translucent coating may also or alternatively be applied to first inlay later 40. For example, a lacquer, shellac, urethane, polyurethane, acrylic, or other type of non-opaque coating may be applied to first inlay layer 40 to provide a protective coating. The coating applied to first inlay layer 40 may also act as a sealer to prevent liquid or solid debris from penetrating first inlay layer 40. Additionally, such sealing properties may advantageously enhance the effects of softening agents used to prevent first inlay layer 40 from cracking or breaking. That is, sealing first inlay layer 40 after softening with a softening agent may slow the evaporation or wearing of the softening agent, thereby prolonging the damage-mitigating effects of the softening agent.

In some embodiments, housing 44 may be non-opaque, that is, clear or translucent. In such embodiments, card information may be added to a back surface of inlay component 48 and may be visible through housing component 44. The card information may include, but is not limited to, card number, a signature, a customer's name, an expiration date of the card, a credit card company logo or mark (e.g., VISA, MasterCard, etc.), a hologram, and/or a card issuing company logo, which may be visible through the clear card housing. By locating the card information on the back side of inlay component 48, the card information may be visible through the clear housing 44 (i.e., after card 21 is assembled) and well protected from the elements and from tampering. In this way, card 21 may be more secure, more durable, and its service life may be prolonged.

Housing component 44 may be made of PVC, PC, or other similar materials, and may be manufactured using a molding process, such as an injection-molding process or a compression-molding process. In some embodiments here housing component 44 is non-opaque, housing component 44 may be formed of a clear material or a material that is clear after manufacturing is complete (e.g., after setting). For example, housing component 44 may be formed of a resin mixture comprising a thermoplastic elastomer (TPE), which renders plastic housing component 44 translucent. In some embodiments, the TPE may be selected to also provide card 21 with a "soft-touch" feel. TPEs may include types of copolymers and/or mixtures of polymers that exhibit properties of thermoplastics and elastomeric materials. For example, the resin mixture may include a polyester elastomer, a block copolymer, a thermoplastic olefin, an elastomeric alloy, a thermoplastic polyurethane, a thermoplastic copolyester, or a thermoplastic polyimide.

Figure 3B:
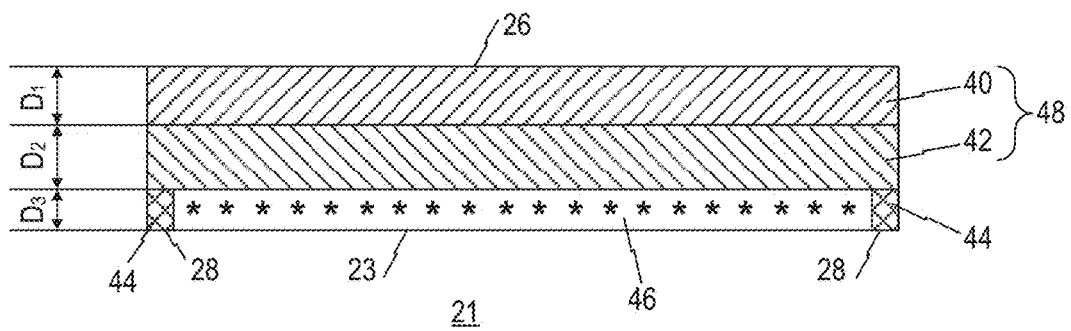
FIG. 3B is a cross-sectional view of the first exemplary transaction card in FIG. 2B taken along line 3B-3B, consistent with disclosed embodiments.

FIG. 3B illustrates a cross-sectional view of the first exemplary embodiment of card 21 shown in FIG. 2B taken along line 3B-3B of FIG. 2B. FIG. 3B is a magnified view of the card construction which illustrates surfaces 23, 26 and 28, first inlay layer 40, second inlay layer 42, housing component 44, and a magnetic strip 46. In some embodiments, as shown in FIG. 3B, surface 23 of magnetic strip 46 may be flush with surface 28 of housing component 44.

Figure 3C:
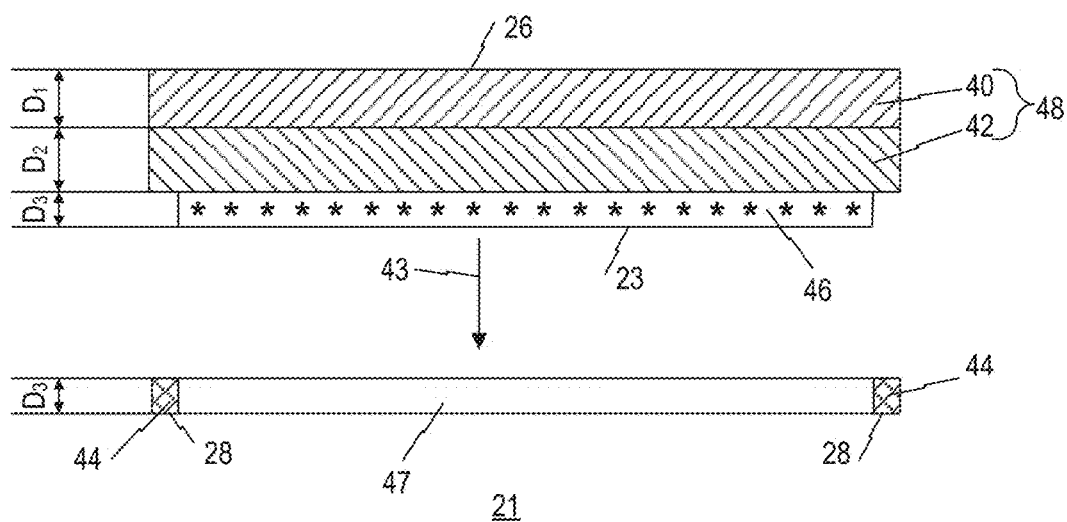
FIG. 3C is a partially disassembled cross-sectional view of the first exemplary transaction card of FIG. 3B, consistent with disclosed embodiments.

To further explain the card construction of the first exemplary embodiment of card 21, FIG. 3C shows a partially disassembled cross-sectional view of card 21 in FIG. 3B. As shown, inlay component 48 may include first inlay layer 40 and second inlay layer 42, magnetic strip 46, and housing component 44 with a window 47 cut out. Housing component 44 may have the same thickness $D_3$ as magnetic strip 46 such that surface 23 of magnetic strip 46 is configured to be flush with surface 28 of housing component 44 when housing component 44 and inlay component 48 are assembled. Housing component 44 may be affixed to inlay component 48 by a fastening mechanism, such as an adhesive layer with a thickness of, for example, about one micron. For example, inlay component 48 and housing component 44 may be joined as indicated by arrow 43.

FIGS. 4A and 4B are front and rear views, respectively, of a second exemplary transaction card, referred to as card 60 herein, consistent with disclosed embodiments. FIG. 4A shows a front surface 66 of an inlay component 67, and a front surface 68 of a housing component 69. The length $L_n$ of inlay component 67, may be less than the length $L_k$ of housing component 69.

FIG. 4B shows a rear surface 70 of card 60 with a surface 63 of a magnetic strip 71 exposed. Magnetic strip 71 has a length $L_j$ which may be less than or equal to the wood inlay length $L_n$, and surface 63 may be flush with rear side surface 68.

A description of second exemplary transaction card 60 is provided to discuss configuration characteristics of card construction. Other details and aspects are the same or similar to first exemplary card 21, including materials and processes for manufacturing, and therefore will not be repeated.

Figure 5A:
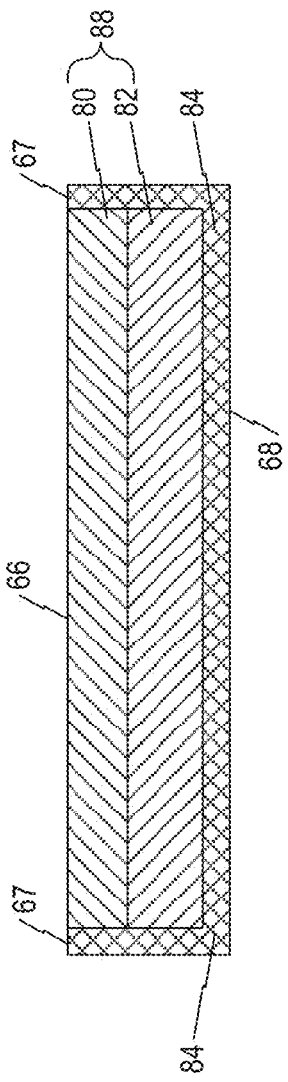
FIG. 5A is a cross-sectional view of the second exemplary transaction card in FIG. 4A taken along line 5A-5A, consistent with disclosed embodiments.

FIG. 5A shows a cross-sectional view of the second exemplary transaction card 60 shown in FIG. 4A taken along line 5A-5A of FIG. 4A. FIG. 5A is a magnified view showing construction details which illustrate surfaces 66, 67 and 68, a first inlay layer 80 of an inlay component 88, a second inlay layer 82 of inlay component 88, and a housing component 84. In card 60, housing component 84 encloses inlay component 88 circumferentially with front surface 67 flush with front surface 66 of inlay component 88, whereas in card 21, inlay component 48 is disposed directly above housing component 44. Such enclosure of inlay component 88 by housing component 84 (e.g., as shown in FIG. 5A) may provide a protection of inlay component 88 to prevent inlay component 88 from being edge damaged or peeling off due to grain stress concentration at peripheral edges of inlay component 88.

Figure 5B:
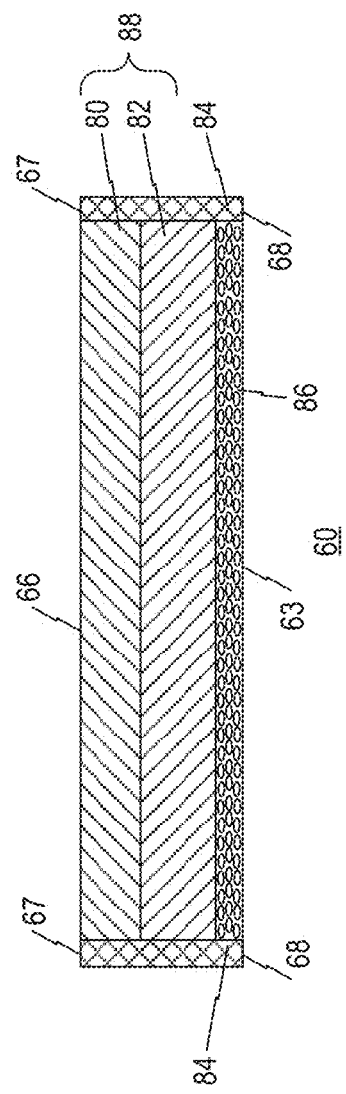
FIG. 5B is a cross-sectional view of the second exemplary transaction card in FIG. 4B taken along line 5B-5B, consistent with disclosed embodiments.

FIG. 5B is a cross-sectional view of second exemplary transaction card 60 in FIG. 4B taken along line 5B-5B of FIG. 4B, which illustrates a surface 63 of a magnetic strip 86, front surface 66 of inlay component 88, front surface 67 of housing component 84, and rear surface 68 of housing 84. FIG. 5B further shows magnetic strip 86 coming through a window cut out of 84. As shown in FIG. 5B, surface 63 of magnetic strip 86 is flush with rear surface 68 of housing component 84.

Figure 6:
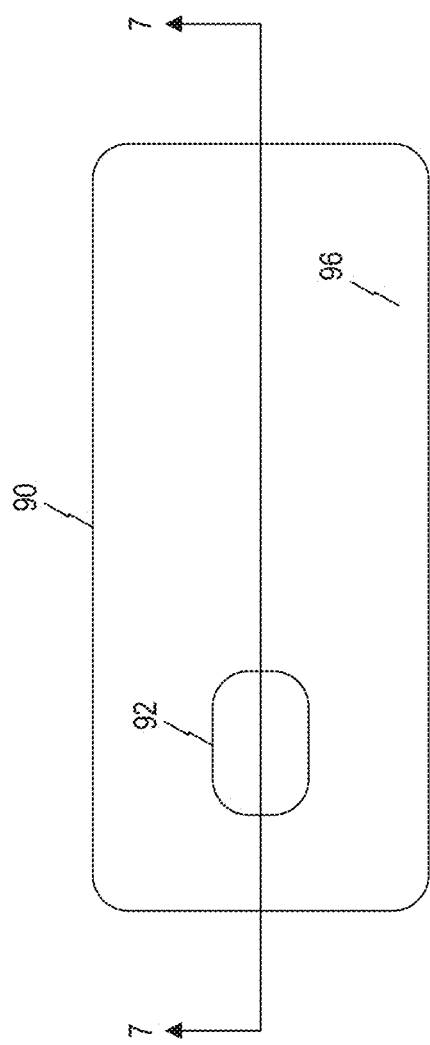
FIG. 6 is a front view of a third exemplary transaction card, consistent with disclosed embodiments.

FIG. 6 is a front view of a third exemplary transaction card 90, consistent with disclosed embodiments. As shown in FIG. 6, a microchip or similar data storage component 92 and a front surface 96 of card 90 are illustrated. Other than component 92 being housed in an inlay component of card 90, other details and aspects of card 90 are the same or similar to first exemplary card 21, thus, will not be described herein.

Figure 7:
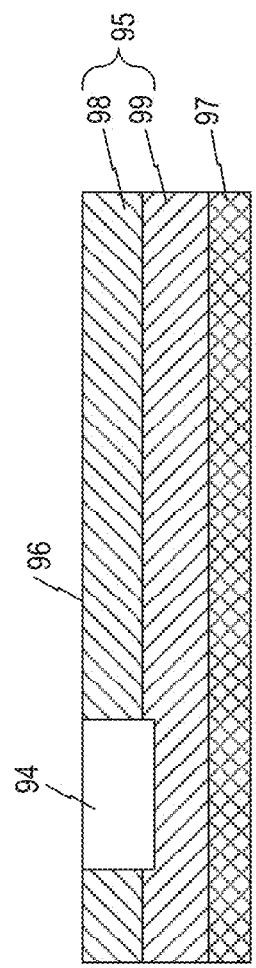
FIG. 7 is a cross-sectional view of the third exemplary transaction card of FIG. 6, taken along the line 7-7, consistent with disclosed embodiments.

FIG. 7 is a cross-sectional view of third exemplary transaction card 90 in FIG. 6 taken along the line 7-7 of FIG. 6, which shows an inlay component 95 comprising a first inlay layer 98, a second inlay layer 99, and a housing component 97. Further, FIG. 7 illustrates a pocket (or void space) 94 cut out of inlay component 95. Pocket 94 may be formed during the formation of inlay component 95 or during a subsequent manufacturing process, such as a milling, laser cutting, stamping, or other process. Pocket 94 may be configured to hold or house data storage component 92 and may pass partially or completely through second inlay layer 99, but does not extend into a magnetic strip (not shown), which may be positioned between second inlay layer 99 and housing component 97. The dimensions and depths of pocket 94 may be set based on a plurality of criteria such as the size and geometry of a particular microchip, industry standards (e.g., ISO standards), manufacturing tolerances, or other considerations.

In some embodiments, a data storage component may be attached to an inner surface of plastic card housing, and a window may be formed in an inlay component to permit access to the data storage component (e.g., to effectuate data transmission). Further, in some embodiments, a data storage component (e.g., a magnetic strip) may be attached to an outer surface of a housing component without a window being formed in an inlay component for exposing the data storage component. Additionally in some embodiments, a second data storage component may be housed in the housing component.

Further, in some embodiments, a window for permitting access to a first data storage component may be formed in an inlay component instead of in a housing component. In some embodiments, a pocket for housing a second data storage component may be formed in a housing component instead of in an inlay component. Alternatively, both a window for permitting access to a first data storage component and a pocket for housing a second data storage component may be formed either in a housing component or in an inlay component.

Figure 8:
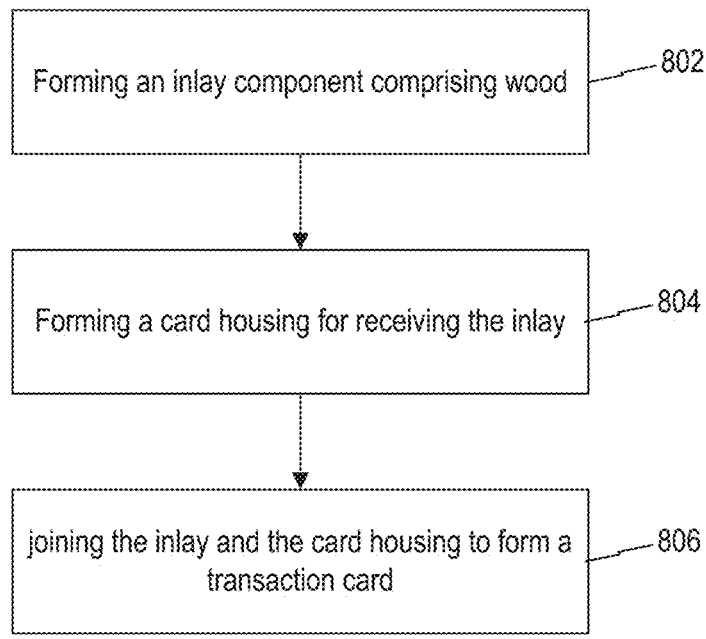
FIG. 8 is a flowchart showing an exemplary method for constructing a transaction card, consistent with the disclosed embodiments.
Figure 9A:
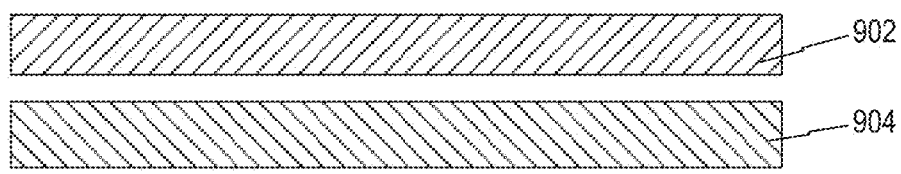
FIG. 9A is a cross-sectional view of a wood inlay and a plastic card housing according to the exemplary method in FIG. 8.

FIG. 8 is a flowchart showing an exemplary method/process 800 for forming a transaction card according to some embodiments of the present disclosure. The exemplary method may include forming an inlay component comprising wood (Step 802). The inlay component may be a one-layer wood inlay, for example, as shown in FIG. 9A, depicting a cross-sectional view of a one-layer wood inlay component 902. Inlay component 902 may be formed of, for example, a MDF wood-containing material. Alternatively, inlay component 902 may include a first inlay layer and a second inlay layer (serving as a backer layer).

At step 804, a housing component is formed for receiving the inlay component. A cross-sectional view of an exemplary housing component 904 is shown in FIG. 9A. The housing component may be made of an opaque material (e.g., PVC, PC, or other similar materials), a non-opaque material (e.g., a translucent or clear TPE material) or a combination thereof. The housing component may be manufactured using a molding process, such as an injection-molding process or a compression-molding process. Alternatively, the housing may be formed using a laminating and/or pressing process. It is noted that other processes may be used.

Figure 9B:
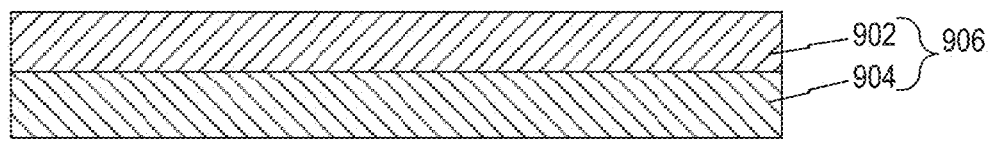
FIG. 9B is a cross-sectional view of a transaction card according to the exemplary method in FIG. 8.

At step 806, the inlay component and the housing component are joined to form a transaction card, as shown in FIG. 9B, depicting a cross-sectional view of an assembled transaction card 906. The housing component may be affixed to the inlay component by a fastening mechanism, such as an adhesive layer with a thickness of, for example, one micron. It is noted that other fastening techniques may be used.

As mentioned previously, different wood materials exhibit different material properties. Some wood materials may exhibit greater resistance to breaking or cracking (particularly during flexure) after a thinning process is performed. Other wood materials may exhibit curling (i.e. warping)

when made to be thin enough to use as a wood inlay on the card. Further, when such a wood material is overly thinned, bending it perpendicular to the grain may cause it to snap. Also bi-directional flexing (twisting) may cause wood material to crack, pop, or break. Therefore, when a wood material is made very thin, it may be provided with a backing to increase rigidity and reduce flexure. The backing may be a fiber backing (e.g., non-porous fiber) or wood of the same or different type.

Figure 10:
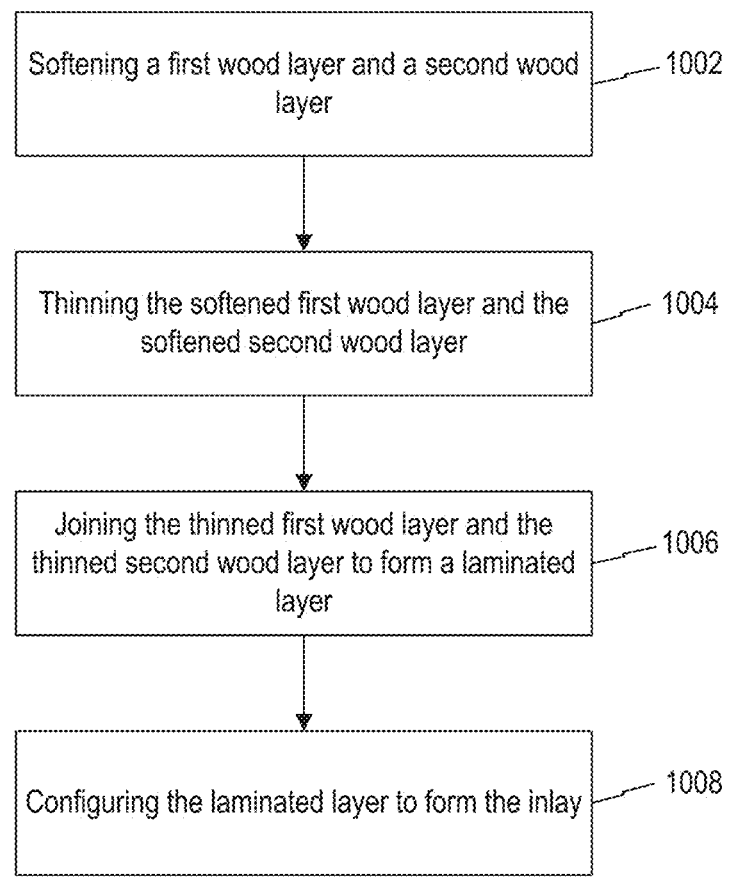
FIG. 10 is a flowchart showing an exemplary method for constructing a wood inlay, consistent with the disclosed embodiments

In some embodiments, a "wood-on-wood" inlay may be formed of two wood layers. FIG. 10 shows an exemplary process 1000 for forming a wood-on-wood inlay according to some embodiments of the present disclosure. The method may comprise softening first and second wood layers (Step 1002); thinning the softened wood layers (Step 1004); joining the thinned wood layers to form a laminated layer (Step 1006); and configuring the laminated layer to form the wood inlay (Step 1008).

At step 1002, first and second wood layers are provided. The first and second wood layers may be made of the same or different wood materials and may have a thickness ranging from about 1/24 inch to about 1/16 inch. A softening process may be employed by, for example, using a veneer softener, to soften the wood layers. The softening process may temporarily plasticize the particles of the wood to reduce tendencies of cracking and breaking during construction of the transaction card.

At step 1004, a thinning process may be employed to reduce the softened wood layers to a desired thickness. The thinning process may comprise, for example sanding, planning, shaving and/or any other suitable thinning process. The desired thickness for the softened wood veneers may be the same or different, and may range from about 10 mil to about 20 mil, depending on industry or material constraints.

Figure 11:
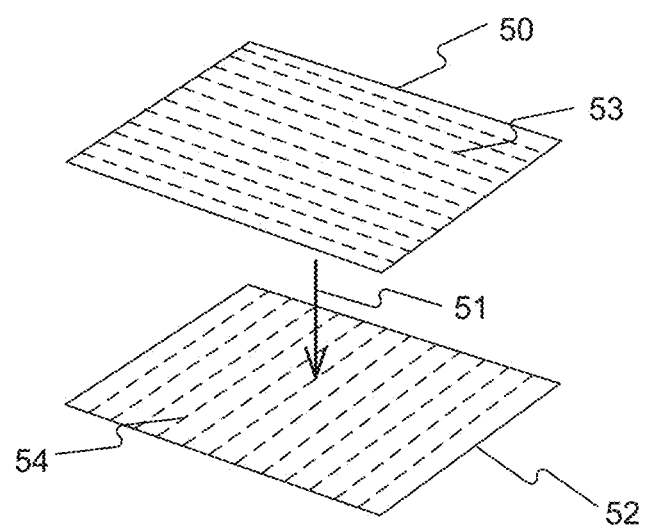
FIG. 11 is a schematic diagram depicting forming a wood-on-wood inlay, according to the exemplary method in FIG. 6A.

At step 1006, the thinned first and second wood layers may be joined by a fastening mechanism, such as an adhesive layer (which may have a thickness of, for example, one micron) or by laminating and/or pressing to form a laminated layer, as shown in FIG. 11. FIG. 11 is a schematic diagram showing an exemplary wood-on-wood inlay assembly process that may be performed at step 1006. In this exemplary embodiment, a first softened and thinned wood layer 50 of a first wood material is laminated to (as indicated by an arrow 51) a second softened and thinned wood layer 52 to form a laminated stack (i.e., a wood inlay stack). Again, the first and second wood materials herein may be the same or different, thus providing a flexibility in selecting wood materials for forming a wood inlay to meet various card performance and appearance criteria.

In some embodiments, at step 1006, a grain direction of a first wood layer may be rotated to a certain angular degree (e.g., 90 degrees) with respect to a grain direction of a second wood veneer layer that acts as a backing layer for the first wood veneer layer. Rotating the wood layers with respect to each other may increase inlay performance by improving the stiffness strength, resilience, and overall durability, even under stresses cause by multi-directional bending. In the exemplary embodiment shown in FIG. 11, a horizontal grain direction (as indicated by 53) of first wood layer 50 is rotated to 90 degrees with respect to a vertical grain direction (as indicated by 54) of second wood layer 52. That is, first wood layer 50 and second wood layer 52 are stacked with their grain structure perpendicular to each other. Herein, a horizontal grain direction indicates that the grain pattern may parallel the length of the card, while a vertical grain direction indicates that the grain pattern may parallel the width of the card.

Further, thicknesses of first and second wood layers may vary depending on, for example, the selected wood materials. For example, greater flexure along one axis than along another axis (e.g., due to varying material types or grain structure alignment) may be enhanced or inhibited by making one wood layer thicker than the other. In some embodiments, both first wood layer 50 and second wood layer 52 may have the same thickness (e.g. 15 mil).

At step 1008 (FIG. 10), the wood inlay component is formed from the laminated layer (e.g., the wood inlay stack formed in FIG. 11) by, for example, die-cutting process, milling, or other suitable process. A milling process may also or alternatively be employed, such as a computer numerical control (CNC) milling process or other automated, semi-automated, or manual milling process. For example, in this exemplary method, the laminated layer may be CNC-milled into the desired wood inlay shape.

In some embodiments, the backing layer (the bottom layer of a wood inlay) may be not a wood material, but may comprise a fabric, such as a woven or non-woven fiber material. In such embodiments, the first wood layer may have a greater thickness than a corresponding second wood layer in a wood-on-wood inlay construction. Accordingly, a card having relatively more wood material and less non-wood backing material may provide some performance benefits, for example, greater strength or durability, and/or a better feel.

In some embodiments, a method for forming a wood-on-fiber inlay may include providing a wood layer having a thickness of about 1/24 inch to about 1/16 inch that may to be softened. The wood veneer may then be thinned, for example by sanding down to a desired thickness (e.g., about 20 mil), and laminated to a non-woven fiber layer that is configured as a backing layer for the wood veneer layer. The non-woven fiber layer may have a thickness of about 10 mil and be joined with the wood veneer with a micron thin layer of adhesive to form a laminated layer. The laminated layer may be shaped, for example by CNC milling, into the wood inlay shape.

Figure 12:
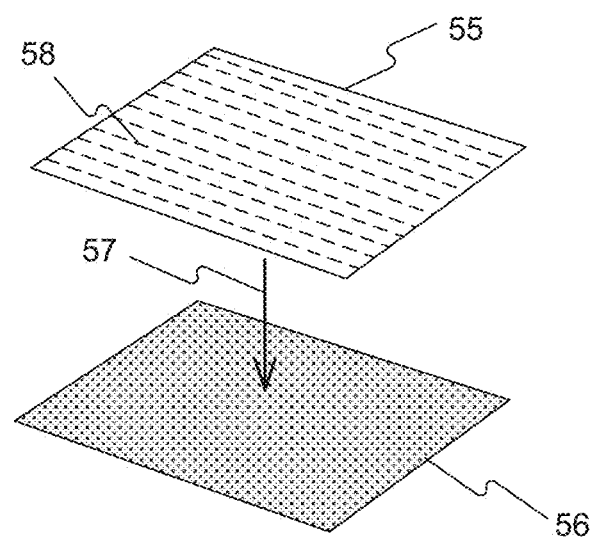
FIG. 12 is a schematic diagram depicting forming a wood-on-fiber inlay, consistent with the disclosed embodiments.

FIG. 12 is a schematic diagram showing an exemplary wood-on-fiber inlay assembly process that may be performed. In FIG. 12, a softened and thinned wood layer 55 having a grain pattern direction 58 is laminated to (as indicated by an arrow 57) a non-woven fiber layer 56 to form a laminated stack (i.e., a wood inlay stack). Fiber layer 56 may comprise, for example, poly-paraphenylene terephthalamide. Further, the thicknesses of the wood layer and the fiber layer may vary depending on the selected wood and fiber materials. Again, a total thickness of a wood inlay may comply with performances standards or set industry standards, such as within 30 mil. In the exemplary embodiment of FIG. 12, wood layer 55 has a thickness of 20 mil and non-woven fiber layer 56 has a thickness of 10 mil, rendering a wood inlay with a total thickness of 30 mil.

In some embodiments where an inlay comprising MDF is formed, a method of manufacture may include providing a sheet of MDF and forming a thin MDF layer from the sheet of MDF by, for example, slicing, shaving, etc. The thin MDF layer may have a thickness ranging from about 10 mil to about 30 mil. The method may include forming a grain pattern on the thin MDF layer by, for example, a die-cutting process, a laser cutting/etching process, or another technique.

In some embodiments, a method may further comprise affixing a data storage component (e.g., a magnetic strip) to an outer surface of a housing component. In some embodiments, a method may further comprise affixing a data storage component (e.g., a magnetic strip) to an inner surface of a housing component. Alternatively, in some embodiments, a method may further comprise affixing a data storage component (e.g., a magnetic strip) to a bottom surface of a wood inlay.

In some embodiments, a method may further comprise forming a window in a wood inlay to permit access to a data storage component disposed within a housing component. In some embodiments, a method may further comprise forming a window in a housing component to expose a data storage component disposed on a bottom surface of a wood inlay. In some embodiments where a housing is a clear housing component, a window formed in the clear housing component may be only partially cut-through and have a depth measured from an inner surface (or a top surface) towards an outer surface (or a bottom surface) of the clear card housing. The window depth may be less than thickness of the clear housing component and up to a depth such that a data storage component (e.g., a magnetic strip) disposed on a bottom surface of a wood inlay may be read by a card reader.

In some embodiments, the window may be formed using a milling process, such as a computer numerical control (CNC) milling process or another automated, semi-automated, or manual milling process. Alternatively, the window may be formed as part of an injection molding process for manufacturing a card housing. Further, alternatively, the window may be formed by a grinding process. Additionally, the window may be formed by a laser cutting process or any other suitable process of material removal.

In some embodiments, a method may further include forming a pocket in a wood inlay for embedding a second data storage component (e.g., a microchip.) In some embodiments, a method may further include forming a pocket in a housing component for embedding a second data storage component (e.g., a microchip.)

While illustrative embodiments have been described herein, the scope includes any and all embodiments having equivalent elements, modifications, omissions, combinations (e.g., of aspects across various embodiments), adaptations or alterations based on the present disclosure. For example, the order of the steps of the above exemplary method may be rearranged in any preferred or suitable order, or any step may be removed or added.

The elements in the claims are to be interpreted broadly based on the language employed in the claims and not limited to examples described in the present specification or during the prosecution of the application, which examples are to be construed as non-exclusive. It is intended, therefore, that the specification and examples be considered as example only, with a true scope and spirit being indicated by the following claims and their full scope of equivalents.

What is claimed is:

1. A method of manufacturing a card, comprising:
forming a housing component;
forming an inlay component having a first inlay layer and a second inlay layer, the first inlay layer having a thickness of between 1/24 and 1/16 of an inch and comprising a wood material, the second inlay layer being configured to reduce deformation of the first inlay layer; and
joining the inlay component and the housing component via a surface of the second inlay layer and a surface of the housing component, such that a surface of the first inlay layer is visible from the exterior of the card.

2. The method of claim 1, wherein the second inlay layer comprises a wood material, and wherein the method further comprises:
rotating the first inlay layer with respect to the second inlay layer such that a wood grain direction of the first inlay layer is non-parallel with a wood grain direction of the second inlay layer.

3. The method of claim 1, wherein the second inlay layer comprises a material different from the first inlay layer.

4. The method of claim 3, wherein the second inlay layer comprises a second wood material.

5. The method of claim 3, wherein the second inlay layer comprises a non-woven fiber material.

6. The method of claim 5, wherein the second inlay layer comprises poly-paraphenylene terephthalamide.

7. The method of claim 1, further comprising:
disposing a data storage component between the inlay component and the housing component.

8. The method of claim 1, wherein the first inlay layer comprises a natural wood.

9. The method of claim 1, wherein the first inlay layer comprises a composite material.

10. The method of claim 9, wherein the first inlay layer comprises medium-density fiberboard.

11. The method of claim 1, wherein the second inlay layer comprises a natural wood.

12. The method of claim 1, wherein the second inlay layer comprises a composite material.

13. The method of claim 12, wherein the second inlay layer comprises medium-density fiberboard.

14. The method of claim 1, further comprising:
disposing a visual blocker layer between the first and second inlay layers.

15. The method of claim 14, wherein the visual blocker layer comprises an opaque material.

16. The method of claim 1, further comprising:
coating a surface of the first inlay layer with a protective layer.

17. The method of claim 16, wherein the protective layer comprises at least one of lacquer, shellac, urethane, polyurethane, or acrylic.

18. The method of claim 1, further comprising:
adding card information to a second surface of the housing component, the card information is visible through the housing component.

19. A method of manufacturing a card, comprising:
forming a housing component;
forming an inlay component having a first inlay layer and a second inlay layer, the first inlay layer having a thickness of between 1/24 and 1/16 of an inch, the first inlay layer comprising a material different from a material of the second inlay layer, the second inlay layer being configured to reduce deformation of the first inlay layer; and
joining the inlay component and the housing component via a surface of the second inlay layer and a surface of the housing component, such that a surface of the first inlay layer is visible from the exterior of the card.

20. A method of manufacturing a card, comprising:
forming a housing component;
forming an inlay component having a first inlay layer and a second inlay layer, the first inlay layer having a thickness of between 1/24 and 1/16 of an inch and comprising a wood material, the second inlay layer being configured to reduce deformation of the first inlay layer;
disposing a visual blocker layer between the first and second inlay layers; and joining the inlay component and the housing component via a surface of the second inlay layer and a surface of the housing component.

\* \* \* \* \*